Nov. 7, 1961  E. D. DALL  3,007,668
SEAT TRACK MECHANISM
Filed Feb. 9, 1959  2 Sheets-Sheet 1
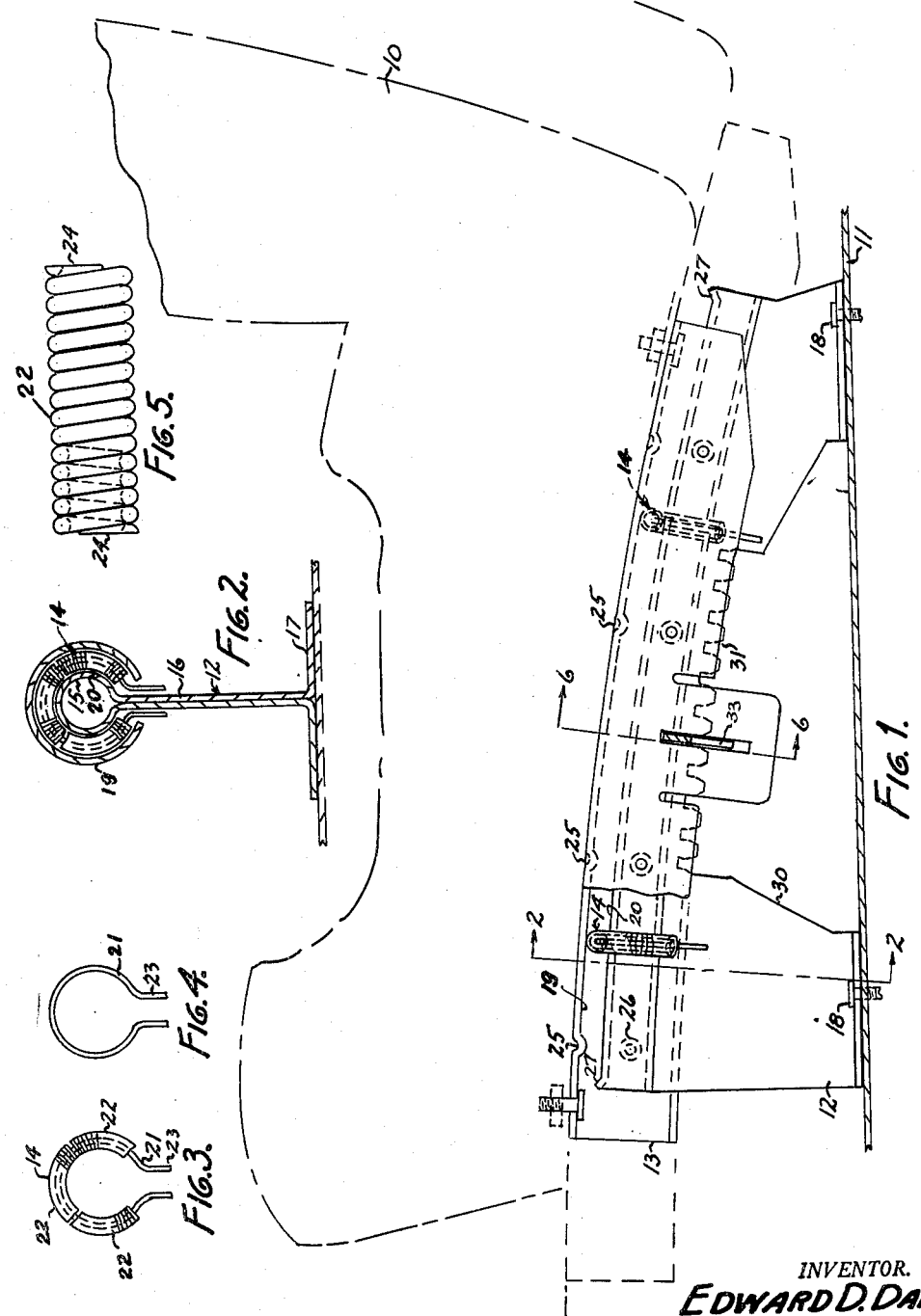
INVENTOR.
EDWARD D. DALL
BY
Barnes, Kisselle, Raisch
& Choate
ATTORNEYS Nov. 7, 1961  E. D. DALL  3,007,668
SEAT TRACK MECHANISM
Filed Feb. 9, 1959  2 Sheets-Sheet 2
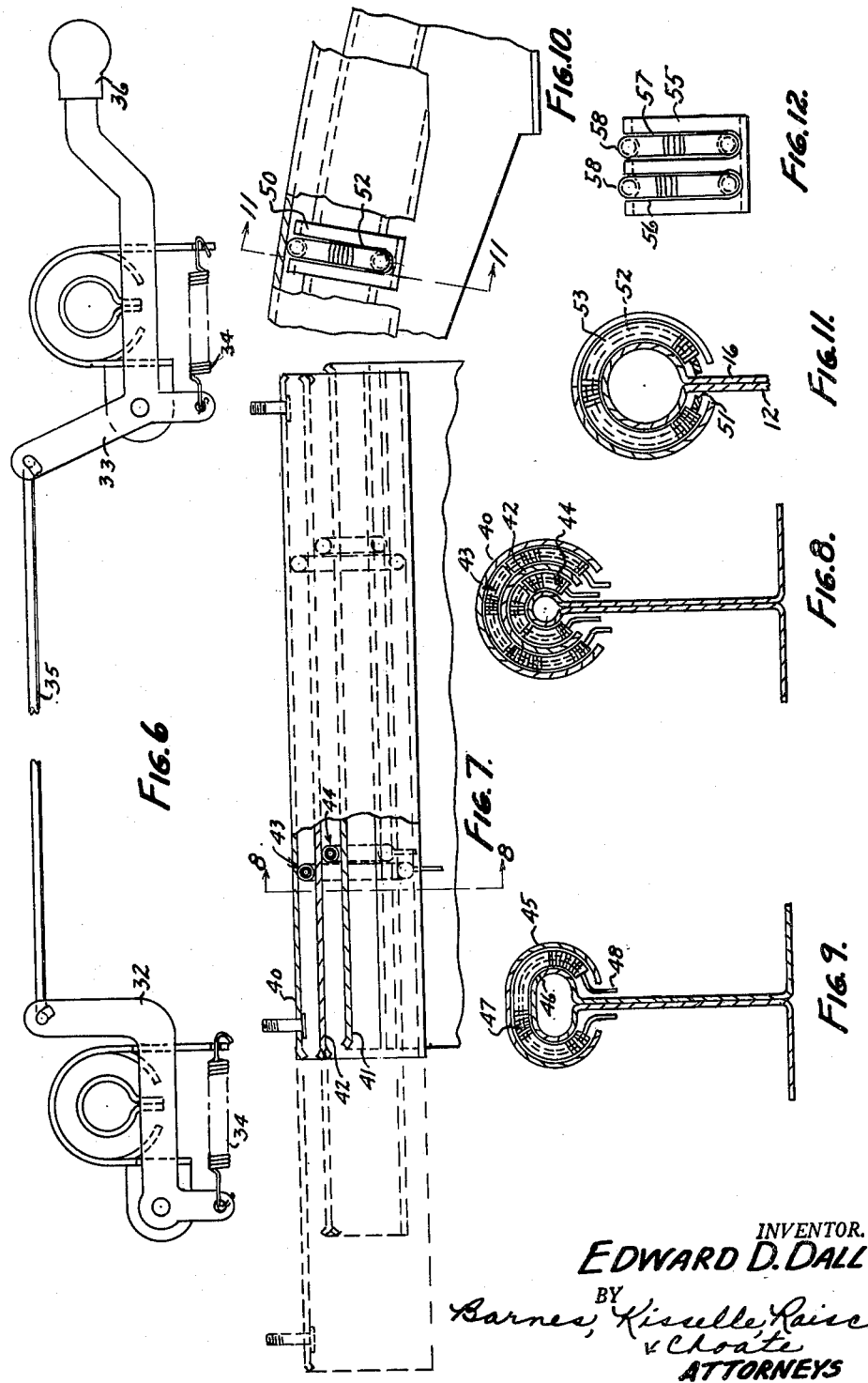
INVENTOR.
EDWARD D. DALL
BY
Barnes, Kisselle, Raisch
& Choate
ATTORNEYS United States Patent Office 3,007,668
Patented Nov. 7, 1961

3,007,668
SEAT TRACK MECHANISM
Edward D. Dall, 30370 Vernon Drive, Birmingham, Mich.
Filed Feb. 9, 1959, Ser. No. 792,153
21 Claims. (Cl. 248—429)

This invention relates to automobile seats and particularly to an anti-friction seat track mechanism for automobile seats.

It is customary in automobiles to provide an anti-friction seat track mechanism on which the seat is mounted for longitudinal movement of the vehicle so that it can be adjusted to accommodate persons of various heights. It is desirable that such seat track mechanism produce a minimum of friction in order to make adjustment easy. In addition, it is essential that the mechanism be such that the seat will not be disconnected from the track during any variations in load or sudden changes in speed of the vehicle.

It is an object of this invention to provide a seat track mechanism which will permit free and relatively frictionless movement of the seat and at the same time will maintain the seat on the track during all load conditions.

It is a further object of the invention to make such a seat track mechanism which is relatively simple in construction and requires a minimum of maintenance.

It is a further object of the invention to provide such a seat track mechanism which can be manufactured at low cost.

Basically, the anti-friction seat track mechanism comprises a carriage on the underside of the seat having a surface complementary to the surface of a support on the floor of a vehicle and a plurality of longitudinally spaced spring bearing assemblies comprising generally helical springs interposed between the complementary surface of the carriage and support and means for maintaining the axis of each spring in a plane transverse to the axis of longitudinal movement of the seat relative to the support.

In the drawings:

FIG. 1 is a fragmentary part sectional side elevation of a seat construction embodying the invention.

FIG. 2 is a fragmentary sectional view taken along the line 2—2 in FIG. 1.

FIG. 3 is a plan view of the spring bearing assembly.

FIG. 4 is a plan view of a portion of the spring bearing assembly shown in FIG. 3.

FIG. 5 is a plan view of a portion of the spring bearing assembly shown in FIG. 3.

FIG. 6 is a fragmentary sectional view taken along the line 6—6 in FIG. 1.

FIG. 7 is a part sectional side elevation of a modified form of seat track mechanism.

FIG. 8 is a sectional view taken along the line 8—8 in FIG. 7.

FIG. 9 is a sectional view similar to FIG. 2 of a further modified form of the invention.

FIG. 10 is a fragmentary part sectional side elevation of a further modified form of the invention utilizing a modified form of spring bearing assembly.

FIG. 11 is a fragmentary sectional view taken along the line 11—11 in FIG. 10.

FIG. 12 is a side elevation of a modified form of spring bearing assembly.

Referring to FIG. 1 which is a side elevation of a seat embodying the invention, seat 10 is mounted for longitudinal movement relative to floor 11 of the vehicle by a structure which includes a support 12 fixed to the floor 11 and a carriage 13 fixed on the underside of the seat 10 and slidably mounted on the support 12 by longitudinally spaced spring bearing assemblies 14.

As shown in FIG. 2, the support 12 comprises a tubular portion 15 at its upper end extending generally longitudinally of the vehicle and having its axis curved upwardly, a double walled intermediate flange portion 16 extending downwardly from the underside of the tubular portion 15 and laterally extending flanges 17 fastened to the floor by suitable means such as bolts 18. The carriage 13 is generally tubular and is adapted to telescopically receive the tubular portion 15 of support 12 and thereby provide an inner surface 19 complementary to the outer surface 20 of the tubular portion 15.

Referring to FIGS. 3, 4 and 5, each spring bearing assembly 14 comprises a retainer 21 made of wire and having a plurality of generally helical springs 22 thereon. Retainer 21 is generally circular and has its ends 23 extending radially outwardly and lying along the flange portion 16 of support 12 thereby preventing rotation of the retainer 21 on the support. Each helical spring 22 comprises a wire formed into a plurality of closely spaced tightly wound convolutions of substantially equal diameter. As shown in FIG. 5, each spring 22 is preferably straight, that is, its axis lies along a straight line, in the untensioned state. In addition, the ends 24 of the spring are ground off square with axis in order to eliminate any sharp projections and provide a smooth surface lying in a single plane at a right angle to the axis of the spring.

Spring bearing assemblies 14 are provided at longitudinally spaced points between the surface 19 and surface 20. In order to limit the movement of each bearing assembly relative to the carriage 13 and tubular portion 15 of support 12, longitudinally spaced stops 25 are provided in the form of indentations in the carriage 13 which are adapted to engage each bearing assembly 14 and limit its longitudinal movement. Additional stops in the form of indentations 26 are provided on the tubular portion 15 of support 12. In addition, the ends of tubular portion 15 are formed with lateral projections 27 to insure that the bearing assemblies 14 will not leave the support 12 during the sliding movement of the seat 10.

In operation, the springs 22 of bearing assemblies 14 rotate on the surface 20 of the tubular portion 15 of support 12 and the inner surface 19 of the carriage 13 to which the seat 10 is fastened. The bearing assemblies 14 travel about one-half the distance of the carriage 13. The movement between carriage 13 and support is free operating and relatively frictionless.

Although I do not wish to be restricted to the theory involved, in my opinion, the beneficial results which are obtained are due to the tendency of the springs 22 to roll on the surface 20 of portion 15 and inner surface 19 of carriage 13 and thereby substantially reduce the friction between the carriage and support 12.

In the structure shown in FIG. 1, a suitable latching mechanism for locking the seat 10 in any adjusted position is provided by cutting away the central portion of web 16 and flanges 17 as at 30 and a plurality of longitudinally spaced notches 31 are provided in the flange underlying the central portion of tubular portion 15. Referring to FIG. 6, latches 32, 33 are pivoted to the carriages 13 on each end of the seat and have portions thereof adapted to engage the notches 31. Each latch is yieldingly urged into engagement with a respective notch by a tension spring 34 extending between each latch 32, 33 and a portion of its respective carriage 13. The latches 32, 33 are interconnected by suitable means such as a rod 35 and one of the latches, preferably the latch 33 on the driver's side, is formed with a handle 36 so that when the latch 33 is moved downwardly by pressing the handle 36 downwardly the latch 32 is also moved downwardly out of engagement with the notches in its respective tubular portion. The seat can then be adjusted longitudinally to a new position and when the handle 36 is released the latches 32, 33, under the action of springs 34, engage a different notch to lock the seat in an adjusted position.

In order to provide for a greater longitudinal movement of the seat, the seat mechanism shown in FIG. 7 may be used and comprises a carriage 40 adapted to be fastened on the underside of the seat, a tubular portion 41 formed on the support fixed to the floor of the vehicle and an intermediate tube 42 between the carriage and the tubular portion 41. Carriage 40, tubular portion 41 and tube 42 are provided with complementary surfaces and spring bearing assemblies 43, are interposed between the carriage 40 and tube 42 and spring bearing assemblies 44 are interposed between the tube 42 and the tubular portion 41 as shown in FIGS. 7 and 8. The bearing assemblies 43, 44 are identical in construction to those shown in the previous form of the invention. By this arrangement, a greater longitudinal movement of the carriage 40 relative to the tubular portion 41 may be obtained because the carriage 40 can telescope a predetermined amount relative to the tube 42 and the tube 42 in turn can telescope a predetermined amount relative to the tubular portion 41.

The cross section of the carriage may have a configuration other than circular. For example, as shown in FIG. 9, the carriage member 45 may be generally oval and the tubular portion 46 of the support may have a corresponding complementary external surface. The bearing assembly 47 in such a case has a bearing retainer 48 having generally the same configuration as the complementary surfaces of carriage 45 and tubular portion 46.

A modified form of retainer 50 is shown in FIGS. 11 and 12 and comprises a sheet metal plate having a generally circular form with the ends 51 thereof spaced from one another so they terminate adjacent the flange portion 16 of support 12. Retainer 50 is formed with a slot 52 extending substantially throughout its length and terminating adjacent the ends 51 thereof. The bearing springs 53 are interposed in the slots 52.

A further modified form of the retainer is shown at 55 in FIG. 12 and is of similar construction as that shown in FIGS. 10, 11. Retainer 55 is generally circular with its ends spaced apart and includes a pair of slots 56, 57 so that a pair of springs 58 may be mounted side by side and provide a broader bearing support for the seat.

It can thus be seen that I have provided a novel antifriction seat track mechanism which is simple in construction and provides a free and relatively frictionless mounting for a seat. The mechanism may be easily constructed and maintained and involves a minimum number of parts resulting in low cost.

I claim:
1. In a seat track, the combination comprising a support adapted to be mounted on a floor and having a longitudinally extending track surface, a carriage adapted to be mounted on the under side of a seat, said carriage having the under surface thereof extending longitudinally and having a configuration similar to the configuration of the upper surface on said support, a plurality of helical springs at longitudinally spaced points between said surfaces of said support and said carriage, each said spring being adapted to roll between said surfaces, and means movable longitudinally of said support and carriage for retaining said springs in position between said surfaces with the axes of said springs extending transversely of the longitudinal axes of said surfaces.

2. In a seat track, the combination comprising a support adapted to be mounted on a floor and having a longitudinally extending track surface, a carriage adapted to be mounted on the under side of a seat, said carriage having the under surface thereof extending longitudinally and having a configuration similar to the configuration of the upper surface on said support, a plurality of helical springs at longitudinally spaced points between said surfaces of said support and said carriage, and means for retaining said springs in position between said surfaces with the axes of said springs extending transversely of the longitudinal axes of said surfaces, said latter means comprising a guide member extending through and within said springs and having means thereon for engaging said support.

3. The combination set forth in claim 1 wherein said latter means comprises a member engaging the periphery of said spring and having means thereon engaging said support.

4. In a seat track, the combination comprising a support adapted to be mounted on a floor of a vehicle and having a longitudinally extending bearing surface, a carriage adapted to be mounted on the under side of a seat and having a longitudinally extending under surface similar to the bearing surface of said support, a plurality of helical springs mounted each at longitudinally spaced points along the length of said support and interposed between said surfaces, each said spring comprising a plurality of closely spaced tightly wound convolutions of substantially identical configuration, each said spring being adapted to roll between said carriage and said support when said carriage is moved longitudinally of said support, and means individual to each said spring and movable with said spring longitudinally of said support and said carriage for maintaining the axis of said spring in a generally transverse direction to the longitudinal axes of said surfaces.

5. In a seat track, the combination comprising a support adapted to be mounted on a floor of a vehicle and having a longitudinally extending bearing surface having an arcuate configuration, a carriage adapted to be mounted on the under side of a seat and having a longitudinally extending under surface similar to the bearing surface of said support, a plurality of helical springs mounted each at longitudinally spaced points along the length of said support and interposed between said surfaces, each said spring comprising a plurality of closely spaced tightly wound convolutions of equal diameter, each said spring being adapted to roll between said surfaces, and means individual to each said spring and movable with each said spring for maintaining the axis of said spring in a generally transverse direction to the longitudinal axes of the surfaces.

6. In a seat track, the combination comprising a generally tubular support adapted to be mounted on a floor of a vehicle, a complementary tubular carriage adapted to be mounted on the under side of a seat and having a surface surrounding a portion of the surface of said tubular support, and bearing means interposed between said surface and said tubular support at longitudinally spaced points along said carriage comprising a plurality of helical springs, each said spring rolling between said surface and said tubular support when said carriage is moved longitudinally, and guide means movable longitudinally with said springs for retaining said springs with their axes extending generally transversely to the longitudinal axis of said tubular support.

7. In a seat track, the combinatoin comprising a generally tubular support adapted to be mounted on a floor of a vehicle, a complementary tubular carriage adapted to be mounted on the under side of a seat and having a surface surrounding a portion of the surface of said tubular support, and bearing means interposed between said surface and said tubular support at longitudinally spaced points along said carriage comprising a plurality of helical springs, and guide means for retaining said springs with their axes extending generally transversely to the longitudinal axis of said tubular support, said guide means comprising a rod extending through said springs.

8. The combination set forth in claim 6 wherein said guide means includes laterally extending projections which engage portions of said support thereby preventing rotation of said guide means.

9. In a seat track, the combination comprising a generally tubular support adapted to be mounted on a floor of a vehicle, a complementary tubular carriage adapted to be mounted on the under side of a seat and having a surface surrounding a portion of the surface of said tubular support, and bearing means interposed between said surface and said tubular support at longitudinally spaced points along said carriage comprising a plurality of helical springs, and guide means for retaining said springs with their axes extending generally transversely to the longitudinal axis of said tubular support, said guide means comprising a generally circular member having an angularly extending slot therethrough in which said spring is positioned.

10. In a seat track, the combination comprising a tubular support adapted to be mounted on a floor and having a longitudinally extending track surface having an arcuate configuration, a carriage adapted to be mounted on the under side of a seat, said carriage having the under surface thereof extending longitudinally and having a configuration similar to the arcuate configuration of the upper surface on said support, a helical spring interposed between the under surface of said carriage and the upper surface of said support, said spring comprising a plurality of convolutions having substantially the same diameter, said spring adapted to roll between said surfaces when said carriage is moved longitudinally relative to said support, and means movable longitudinally with said spring for retaining said spring in position with its longitudinal axis extending transversely of the longitudinal axes of said surfaces.

11. In a seat track, the combination comprising a support adapted to be mounted on a floor of a vehicle and having a longitudinally extending bearing surface, a carriage adapted to be mounted on the under side of a seat and having a longitudinally extending under surface, a tube positioned between said surfaces and a plurality of helical springs mounted at longitudinally spaced points along the length of said support and interposed between said tube and said surfaces, each said spring being adapted to roll relative to the surfaces with which it is in contact, and means individual to each said spring and movable longitudinally with said spring for maintaining the axis of said spring in a generally transverse direction to the longitudinal axes of said surfaces.

12. In a seat track, the combination comprising a support adapted to be mounted on a floor of a vehicle and having a longitudinally extending bearing surface, a carriage adapted to be mounted on the under side of a seat and having a longitudinally extending under surface, a plurality of helical springs mounted each at longitudinally spaced points along the length of said support and interposed between said surfaces, each said spring being adapted to roll between said surfaces when said carriage is moved longitudinally relative to said support, guide means individual to each said spring and movable longitudinally with said spring for maintaining the axis of said spring in a generally transverse direction to the longitudinal axes of the surfaces and means on one of said surfaces for limiting longitudinal movement of each spring.

13. In a seat track, the combination comprising a generally tubular support adapted to be mounted on a floor of a vehicle, the axis of said support being curved upwardly, a complementary tubular carriage adapted to be mounted on the under side of a seat and having a surface surrounding a portion of the surface of said tubular support, bearing means interposed between said surface and said tubular support at longitudinally spaced points along said carriage comprising a plurality of springs, each said spring being adapted to roll when said carriage is moved longitudinally relative to said support, and guide means movable longitudinally with said springs for retaining said springs with their axes extending generally transversely to the longitudinal axis of said tubular support.

14. In an anti-friction spring bearing assembly adapted to be positioned between spaced complementary surfaces of a carriage and a support wherein the carriage is adapted to be reciprocated longitudinally of said support, the combination comprising a generally helical spring and a guide member movable with said spring for supporting said spring with its axis generally transversely of the longitudinal axis of said carriage and support.

15. In an anti-friction spring bearing assembly adapted to be positioned between spaced complementary surfaces of a carriage and a support wherein the carriage is adapted to be reciprocated longitudinally of said support, the combination comprising a plurality of generally helical springs and a guide member comprising a wire rod extending through said springs, the ends of said guide member extending radially outwardly.

16. In an anti-friction spring bearing assembly adapted to be positioned between spaced complementary surfaces of a carriage and a support wherein the carriage is adapted to be reciprocated longitudinally of said support, the combination comprising a generally helical spring and a guide member comprising an arcuate plate member of generally uniform diameter, the ends of said member being spaced from one another, said member having an angularly extending slot therethrough, said spring being positioned in said slot when the assembly is in position between the surfaces of said support and said carriage.

17. In a spring bearing assembly adapted to be positioned between spaced complementary surfaces of a carriage and a support wherein the carriage is adapted to be reciprocated longitudinally of said support, the combination comprising a plurality of generally helical springs and a guide member comprising an arcuate plate member of generally uniform diameter, the ends of said member being spaced from one another, said member being provided with a plurality of spaced angularly extending slots, said springs being positioned in said slots when said bearing assembly is interposed between the surfaces of the support and carriage.

18. In an anti-friction assembly comprising a support having a longitudinally extending track surface, a carriage having the surface thereof extending longitudinally and having a configuration similar to the configuration of the surface on said support, a helical spring interposed between the surface of said carriage and the surface of said support, said spring being adapted to roll between said surfaces, and means movable longitudinally with said spring for retaining said spring in position with its longitudinal axis extending transversely of the longitudinal axes of said surfaces.

19. The combination set forth in claim 18 wherein said spring comprises one of a plurality of longitudinally spaced springs.

20. In an anti-friction assembly comprising a support having a longitudinally extending track surface, a carriage having the surface thereof extending longitudinally and having a configuration similar to the configuration of the surface on said support, a plurality of helical springs interposed between the surfaces of said carriage and said support, in aligned relation, each said spring being adapted to roll between said surfaces, and means movable with said springs for maintaining said springs with their axes in a single plane extending transversely of the longitudinal axes of said surfaces.

21. In a seat track, the combination comprising a support adapted to be mounted on a floor and having a longitudinally extending track surface, a carriage adapted to be mounted on the under side of a seat, said carriage having the under surface thereof extending longitudinally and having a configuration similar to the configuration of the upper surface on said support, a plurality of helical springs at longitudinally spaced points between said surfaces of said support and said carriage, and means for retaining said springs in position between said surfaces with the axes of said springs extending transversely of the longitudinal axes of said surfaces, said latter means comprising a plurality of circular members, each circular member having an angularly extending slot therethrough in which a spring is positioned.

References Cited in the file of this patent

UNITED STATES PATENTS

| | | |
|---|---|---|
| 874,348 | Remond | Dec. 17, 1907 |
| 1,824,193 | Bovingdon | Sept. 22, 1931 |
| 2,101,346 | Robertson | Dec. 7, 1937 |
| 2,225,929 | Sarazin | Dec. 24, 1940 |
| 2,311,815 | Briney | Feb. 23, 1943 |
| 2,612,208 | Rhodes | Sept. 30, 1952 |
| 2,725,921 | Markin | Dec. 6, 1955 |